Dec. 7, 1926.  
A. L. KNAPP  
MOTOR VEHICLE  
Original Filed Oct. 1, 1919
1,609,726
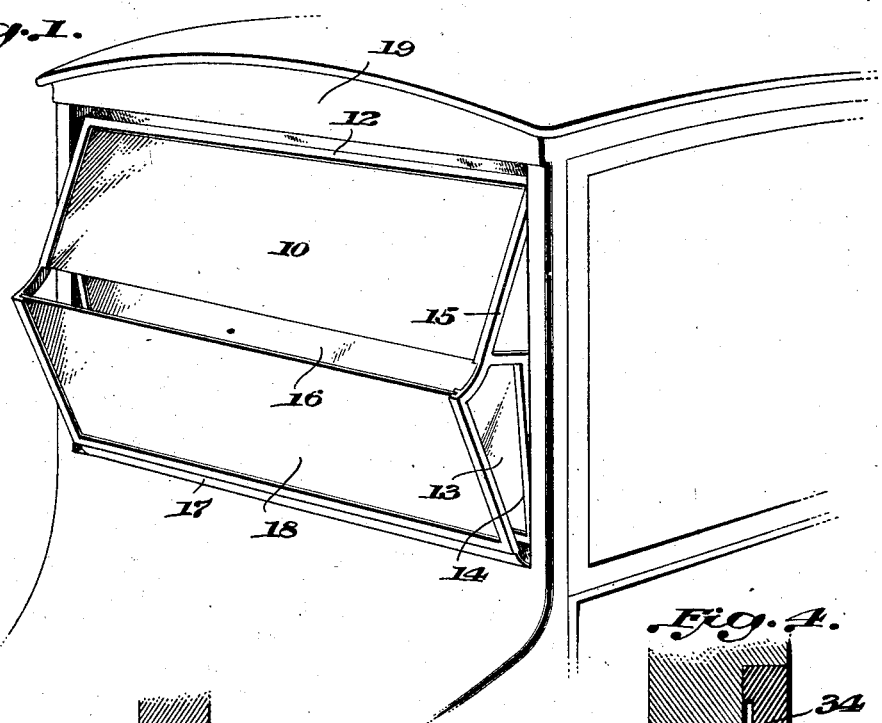
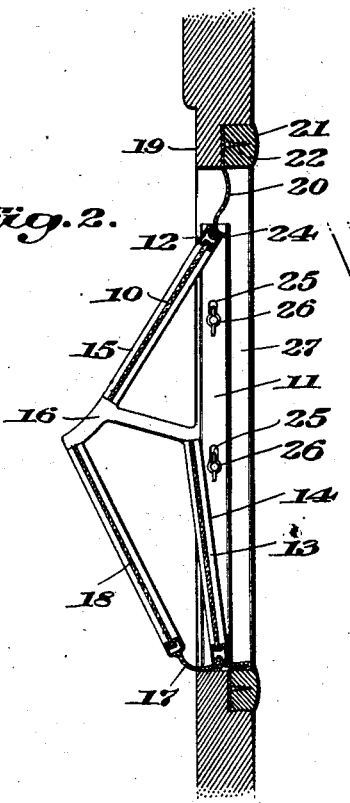
Inventor,
Archer L. Knapp,
By Milton Sibbetts, Atty.

Patented Dec. 7, 1926.

1,609,726

UNITED STATES PATENT OFFICE.

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed October 1, 1919, Serial No. 327,699. Renewed July 30, 1926.

This invention relates to motor vehicles and more particularly to windshields therefor.

The present object of the invention is to provide means for enabling the vertical adjustment of the clear field of vision relative to the level of the eyes of the driver in that type of windshields known as clear vision windshields.

With this object and others in view, the invention is embodied in preferable form in the construction and arrangement hereinafter described and illustrated in the accompanying drawings.

In these drawings, Fig. 1 is a perspective view of part of a motor vehicle showing a windshield of the clear vision type applied thereto, Fig. 2 is an enlarged vertical section of a clear vision windshield showing one form of my invention in connection therewith, Fig. 3 is an enlarged detail vertical section showing the lower part of the windshield and Fig. 4 is a sectional detail of the upper part of the windshield showing a modified form of the invention.

Referring to the drawings, 10 indicates the upper sash of a rigid windshield. This sash extends forwardly and downwardly from the upper ends of vertical side rails 11 of the frame of the windshield, the cross rail 12 of which constitutes the upper border of the sash 10.

The lower half of the windshield preferably comprises two sashes, each extending angularly forward from the lower end of the main windshield frame but at different angles to the rails of said frame and spaced apart.

13 indicates one of the sash members, the side bars 14 of which are extended up and connected with the side bars 15 of the frame of the upper sash 10. The lower ends of these side bars 14 are fixed to the vertical main frame rails 11.

The upper edge of the pane of the sash 13 terminates below the level of the lower end of the upper sash 10, leaving a space 16 between the ends of the two sash members, which space affords a field of clear vision on a horizontal line from the eyes of the driver in the seat of the car.

Connected to the lower part of the main frame and extending forward in front of the sash 13 is a support or bracket 17, which carries an additional inclined sash 18 which extends forward from the main frame at a greater angle thereto than the lower sash 13. The upper end of this sash 18 is on a line with the upper edge of the said sash 13 so as not to interrupt the vertical space between the upper end of the sashes 13 and 18 and the lower end of the sash 10, and thereby maintain a clear field of vision before the eye of the driver. The space between the sashes 13 and 18 is open at the sides, whereby a suction is created upon the air and rain that may enter through the space between the front edges of the upper and lower sashes so that it will be drawn out to one side of the car and the driver thereby protected. A draft will be created from the car to the outside thereof that will induce ventilation through the car.

In order to obtain an adjustment of the windshield so as to accommodate the line of clear vision through the windshield to persons of varying heights, there is provided in the present invention, according to the construction of Fig. 2, between the upper edge of the main frame of the windshield and the fixed cross bar 19 of the top, a connecting strip of flexible material 20, which serves as a collapsible hinge and is secured to the fixed top by means of a clamping bar 21 which is engaged to the top by screws 22. This flexible strip is preferably doubled upon itself and at its lower edge forms a loop which is engaged by a pintle 23 fitting in a curved keyhole socket 24 in the upper rail of the main frame. The side rail of this main frame is provided with vertical slots 25 adapted to be engaged by set screws 26 which enter into the vertical post 27 of the body whereby when the screws are loosened the vertical rail of the frame may be moved up or down with respect to the post. An identical clamping construction is provided at each side of the frame to obtain this vertical movement and to fix the frame in the desired position of adjustment.

At the lower end of the frame between the lower edge thereof and the lower horizontal rail of the body 28 is provided a flexible strip 29 similar in its construction and in its mode of fastening to the upper strip which connects the upper end of the frame with the top. These two strips are continuous from side to side of the rail and constitute closures which prevent the entrance of air and rain through the windshield adjacent the top and body, while at the same time performing their chief function of providing flexible connecting means which will permit the vertical adjustment of the windshield.

The adjustment capable of being obtained by this arrangement is made only to accommodate the clear vision field of the windshield to drivers whose lines of vision are at different levels. After the adjustment to suit the height of the line of vision of the particular driver to which the shield is to be adapted, the same remains in fixed position.

In Fig. 4, a construction is illustrated in which the means of obtaining the adjustment while maintaining a closed joint between the borders of the windshield and the adjacent portions of the top and body, consists of rigid members slidable with the frame.

Referring to the illustration of this arrangement 30 indicates the top sash rail of the frame and 31 indicates a metallic U-shaped member suitably fastened to said rail and having one limb 32 thereof adapted to bear against the rear face of the upper cross rail of the top and the other limb adapted to bear against the front face of said top rail. A clamp and cover strip or moulding 33 is secured to the said top rail but spaced a slight distance therefrom to provide a vertical slot 34 in which said rear limb of the U-shaped member is adapted to slide, by which arrangement not only is a guiding slot provided for said member but also the same is for the greater part thereof concealed from view at the rear of the windshield and a more ornamental finish for the top is provided.

In this construction the said rear limb 32 is provided with a slot 35 through which screws 36 are adapted to pass to clamp the said member against the frame and hold it in various positions of adjustment. This member provides not only an adjusting means for the frame but also a closure for the spaces between the upper edge of the frame and the top.

The arrangement shown in Fig. 4, similarly to the construction in Fig. 2, thus serves the double purpose of permitting the area of clear vision through the windshield to be adjusted to different levels while at the same time maintaining a closed joint in the upper and lower borders of the windshield frame.

Having thus described my invention, what I claim and desire to secure by Letters Patent is:

1. In a motor vehicle, in combination, a body having a windshield opening, a windshield unit comprising a frame having upper and lower sashes relatively fixed to provide an unvarying clear space in the line of vision, means connecting the windshield unit to the body providing adjustment thereof to vary the height of said space, means joining the upper and lower borders of the windshield unit with the adjacent parts of the body for closing the space therebetween, and means for clamping the windshield unit in adjusted position.

2. In a motor vehicle, a body, a windshield comprising a frame vertically adjustable on said body and having fixed upper and lower sashes mounted therein at different angles, and flexible connecting means between the upper and lower edges of said windshield and said body.

3. In a motor vehicle, a body, a windshield comprising a frame vertically adjustable on said body and having fixed upper and lower sashes mounted therein at different angles, and adjustable connecting means between the upper and lower edges of said windshield and said body.

4. In a motor vehicle, a body, and a windshield comprising a frame vertically adjustable on said body and having a pair of lower sashes and an upper sash, the upper and lower sashes being vertically spaced apart to permit vision therebetween whereby the vision space may be adjusted to the height of the vehicle driver.

In testimony whereof I affix my signature.

ARCHER L. KNAPP.